Dec. 5, 1961

F. M. BELL 3,012,108

TELEPHONE ACCESSORY

Filed March 23, 1959

INVENTOR
FRANCINE M. BELL
BY
Williamson, Schroeder & Palmatier
ATTORNEYS

United States Patent Office 3,012,108

Patented Dec. 5, 1961

3,012,108

TELEPHONE ACCESSORY

Francine M. Bell, Rte. 2, Box 291, Mound, Minn.

Filed Mar. 23, 1959, Ser. No. 801,352
5 Claims. (Cl. 179—187)

This invention relates to telephone attachments and more specifically to an attachment for a telephone which permits the reception and transmittal of a telephone conversation in a confidential manner.

Attachments have been provided for conventional telephones which permit a user to speak into the transmitter without being heard by persons nearby. However, none of the attachments permit the user to both receive and transmit a telephone conversation in a confidential manner. People having different physiognomies have difficulty in effectively utilizing these attachments, especially those persons having a relatively large spacing between their mouth and ear. Further some of the attachments of this kind interfere with the seating of the conventional cradle and wall type phones in their respective cradle and wall type supports when these attachments are applied. The present invention is directed toward solving these problems.

The general object of my invention is to provide a novel and inexpensive attachment for a conventional cradle type telephone whereby a user may receive and transmit telephonic conversation in a confidential manner;

Another object of my invention is to provide a novel attachment for a coventional telephone arranged and constructed so as to permit proper seating of the telephone on the cradle and wall type support;

A further object of my invention is to provide a novel attachment for a conventional type telephone transmitter arranged and constructed to permit a user having a large spacing between his ear and mouth to effectively and comfortably utilize the attachment;

A still further object of my invention is to provide a novel attachment for the receiver of a conventional cradle type telephone constructed in a manner to exclude all exterior noises and permit the user to receive a telephone conversation in a confidential manner.

These and other objects and advantages of my invention will more fully appear from the following description, made in connection with the accompanying drawings, wherein like reference characters refer to the same or similar parts throughout the several views, and in which.

Figure 1:
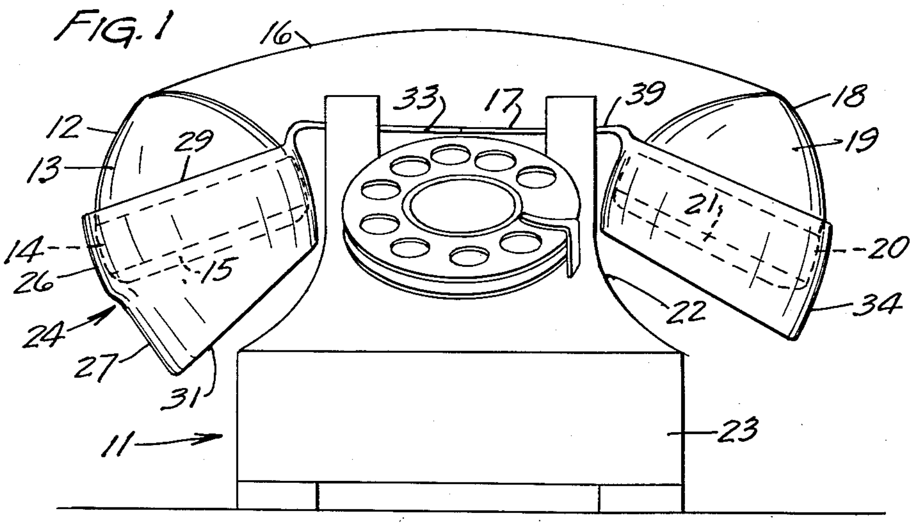
FIG. 1 is a side elevation view of a conventional cradle type telephone having the novel attachment secured thereto.

In the embodiment shown, telephonic apparatus 10 is secured to conventional cradle type telephone 11. Cradle type telephone 11 includes a telephone transmitter 12 having a conical body portion 13 and cylindrical portion 14 which is provided with a perforated diaphragm 15. An elongated handle 16 of predetermined length and of generally triangular cross section shape has a relatively flat bottom side 17. Elongated handle 16 interconnects transmitter 12 with a conventional receiver 18 having a substantially conical body portion 19 and a cylindrical portion 20 provided with a perforated diaphragm 21. Handle 16 is disposed in seating relation upon a conventional cradle support 22 whose downwardly extending walls flare outwardly and terminate in a base portion 23. The above described telephone structure, of course, is conventional.

Figure 2:
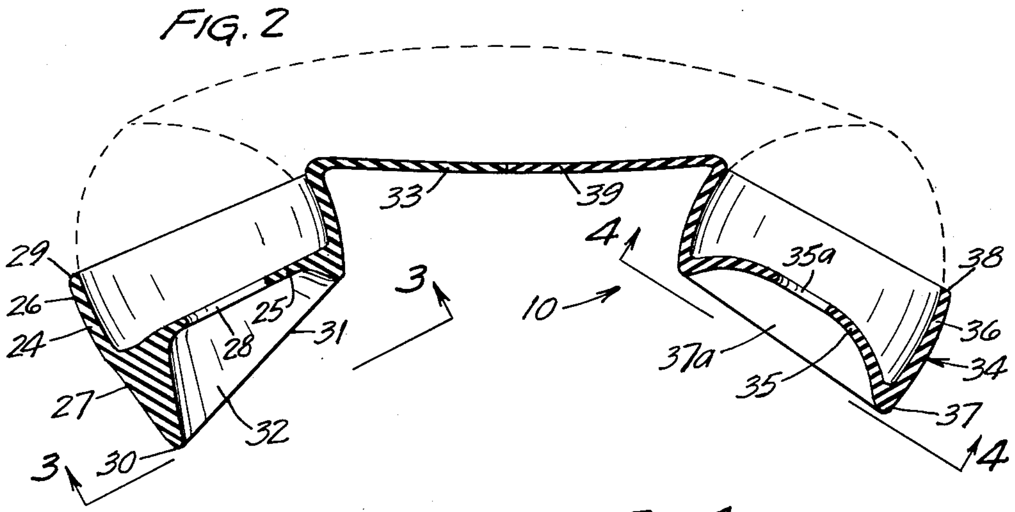
FIG. 2 is a longitudinal section of the attachment with a telephone instrument shown in dotted lines.
Figure 3:
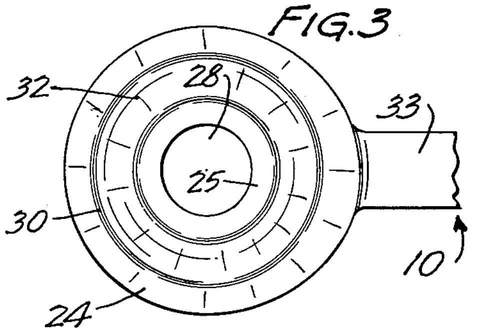
FIG. 3 is a bottom plan view of the transmitter attachment taken along lines 3—3 of FIG. 2 and looking in the direction of the arrows.
Figure 4:
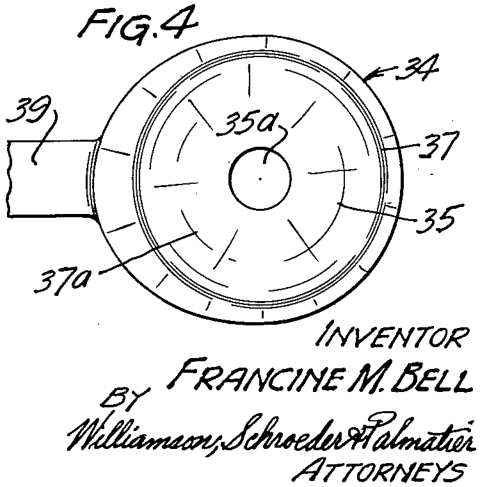
FIG. 4 is a bottom plan view of the receiver attachment taken on lines 4—4 of FIG. 2 and looking in the direction of the arrows.

Telephonic apparatus 10 includes a hollow transmitter attachment member 24 of generally truncated conical shape and open at both ends. A disc shaped diaphragm 25 has its circumferential edge secured to the inner wall surface of transmitter attachment member 24 and is disposed intermediate the ends thereof to thereby divide the transmitter attachment into a relatively deep socket portion 26 and a mouth receiving portion 27. Diaphragm 25 has a centrally located opening 28 therein. Socket portion 26 in a free or unattached condition is substantially cylindrical in shape having a slightly inwardly converging rim 29. Mouth receiving portion 27 has a curved outwardly protruding lip portion 30 which defines an inclined rim 31. In cross section, as shown in FIG. 2, the inner wall surfaces of mouth receiving portion 27 diverge outwardly from diaphragm 25 to thereby define a funnel shaped voice receiving chamber 32 for channeling sound towards opening 28. Transmitter attachment 24 has a relatively flat shank portion 33 secured to socket portion rim 31 oppositely of curved lip portion 30 and extends transversely outwardly of transmitter attachment 24.

Telephonic apparatus 10 further comprises a cup shaped receiver attachment member 34 open at both ends and having an inwardly extending frusto-conical shaped diaphragm 35 which divides the receiver attachment member into a socket portion 36 and an ear receiving portion 37. Diaphragm 35 has a centrally located opening **35*a* therein. It will be noted from FIG. 2 that diaphragm 35 defines a funnel shaped ear receiving chamber 37*a*. Socket portion 36 is of generally cylindrical shape when receiver attachment member 34 is unattached and terminates in a slightly inwardly converging rim 38. Diaphragm 35 is secured along its circumferential edge to attachment 34. A relatively flat shank portion 39 is secured to rim 38** and extends transversely outwardly of the receiver attachment.

The telephonic device 10 is molded as a unit so that shank 33 and shank 39 are of integral construction and is formed of a yieldable elastic material which in the preferred embodiment is a low duramater plastisol. Plastisol is the descriptive name of a Polyvinyl chloride resin dispersed in a suitable plasticizer such as dioctyl or phthalate and properly stabilized with light and heat. It is pointed out, however, that any suitable, yieldable elastic material such as various plastics, elastomers or foam material may be used.

There are two or three different types of conventional cradle type or French phones which vary slightly in the overall length of handle 16 and have slight dimensional differences in the height of the cradle support. The conventional wall type phones also vary in overall length of handle 16. Therefore, the integral shank structure 33, 39 is cut to permit attachment to the various types of cradle telephones.

Socket portion 26, of transmitter attachment 24, upon stretching frictionally receives the entire cylindrical portion 14 of transmitter 12 so that diaphragm 25 is disposed in contacting relation with the perforated transmitter diaphragm 15. Protruding lip 30 is positioned adjacent to and forms an extension of the outer peripheral surface of transmitter 12. It will be noted that the shank portion 33 is located in diametrically opposed relation to protruding lip 30 and contacts the lower side 17 of handle 16. Shank portion 33 is secured to the lower side 17 by means of a suitable adhesive.

Socket portion 36 of receiver attachment 34 upon stretching frictionally receives the entire cylindrical portion 20 of receiver 18 so that shank portion 39 is positioned adjacent the lower side wall 17 of handle 16. Shank portion 39 also is secured to lower side 17 of handle 16 by means of a suitable adhesive material such as an epoxy base adhesive. Diaphragm 35 is positioned closely adjacent but spaced from the perforated diaphragm 21 of receiver 18. When so attached, it will be noted that the free edges of shanks 33, 39 are in abutting relation to form a continuous elongated member. However, in phones having a longer handle the free ends of shanks 33 and 39 will be slightly spaced. Shank portions 33, 39 when secured to the lower side 17 of handle 16, space handle 16 and conical member 24 from the cradle type phones having shorter cradle supports in order to permit lip portion 30 to clear the side walls of cradle support whereby the handle can be properly seated on the cradle support. In wall type phones, the transmitter is seated upon a cradle support and the handle is vertically suspended. The receiver attachment member 24 does not interfere with the seating relation of the transmitter upon the cradle support in phones of this type. It can thus be seen that shank portions 33, 39 function as a means for securing the telephonic apparatus to the telephone handle, a spacing means which permits proper seating of the handle on the cradle support and further reinforces each respective attachment member.

In use, a person holds the telephone instrument so that the mouth receiving portion 27 is pressed around the user's mouth and the receiver attachment member 34 is pressed against the ear of a user. Since the telephonic apparatus is made of yieldable elastic material, protruding lip portion 30 will flex outwardly to thereby accommodate persons having a large spacing between their ear and mouth to comfortably and effectively utilize the device. A user speaking into the voice receiving chamber 32 may carry on a conversation whereby persons nearby are unable to hear such a conversation. The funnel shaped voice chamber 32 effectively channels sound into the transmitter.

When a receiver attachment member 34 is pressed against the ear, all outside noises are shielded from ear receiving chamber 37*a* while the user may receive sounds in a confidential manner.

The transmitter attachment member 24 and the receiver attachment 34 are, of course, sprayed with a vinyl solution in order to obtain the requisite antiseptic condition. It will thus be seen from the preceding paragraphs that I have provided a novel telephone attachment whereby a person may receive and transmit telephone conversations in a confidential manner. The attachment is so arranged and constructed that proper seating of the telephone instrument on the cradle is accomplished and persons having different physiognomies may thereby comfortably and effectively utilize my device.

It will, of course, be understood that various changes may be made in the form, details, arrangement and proportions of the parts without departing from the scope of my invention which consists of the matter shown and described herein and set forth in the appended claims.

What is claimed is:

1. An attachment adapted for use with a conventional cradle type telephone instrument comprising a hollow substantially conical truncated member having a continuous peripheral wall and being open at both ends thereof, said member being integrally formed of yieldable elastic material, a disc-shaped diaphragm integrally formed with and disposed intermediate the ends of said member, said diaphragm being disposed substantially normal to the axis of said member to thereby divide said member into a relatively deep socket portion and a mouth receiving portion, said mouth receiving portion having a substantially circular, smooth continuous inner wall surface diverging outwardly from said diaphragm and terminating in a continuous circumferential edge lying in a plane disposed at an angle with respect to the axis of said member to thereby define a protruding lip, said circumferential edge adapted to be engaged by the face of a user around his mouth, said socket portion adapted to receive and frictionally engage the periphery of the transmitter and to position the lip adjacent the outer edge of the transmitter, and said protruding lip adapted to flex outwardly to thereby permit persons having a large spacing between their ear and mouth to effectively and comfortably use the apparatus.

2. The structure set forth in claim 1 wherein said socket portion serves to receive the entire cylindrical part of a circular transmitter to thereby position said diaphragm closely adjacent the perforated face of the transmitter.

3. A telephonic apparatus comprising a conventional telephone instrument having a transmitter, receiver, a handle of predetermined length interconnecting the transmitter and receiver and a cradle support, a hollow substantially conical truncated member open at both ends, said conical member provided with a diaphragm disposed intermediate the ends thereof to thereby divide said member into a relatively deep socket portion and a mouth receiving portion, said transmitter received within the socket portion and having its outer peripheral surfaces frictionally engaged by said socket portion, said mouth receiving portion terminating outwardly in a continuous circumferential rim lying in a plane disposed at an angle to the axis of said member, said continuous rim adapted to be engaged by the face of a user around his mouth, a substantially cylindrical cup shaped member open at both ends and provided with an inwardly extending diaphragm of substantially frusto-conical shape defining an ear receiving portion, said receiver received within said cup shaped member and having its peripheral surface frictionally engaged by the cup shaped member and means interconnecting said members whereby a user may transmit and receive a telephonic conversation in a confidential manner.

4. The structure set forth in claim 3 wherein said elongated shank element extending between said members and secured to the underside of the handle, said shank element being disposed between said interconnecting means includes handle and said cradle support when said handle is seated upon said cradle support to thereby space said handle and conical member from said cradle support.

5. An attachment adapted for use with a conventional cradle type telephone instrument comprising a hollow substantially conical truncated member open at both ends and formed of yieldable elastic material, said member having a disc shaped diaphragm disposed intermediate the ends thereof and normal to the axis of said member to thereby divide said member into a relatively deep socket portion and a mouth receiving portion, said mouth receiving portion terminating outwardly in a continuous circumferential edge lying in a plane disposed at an angle to the axis of said member to thereby define a protruding lip, said continuous edge adapted to be engaged by the face of a user around his mouth and said protruding lip adapted to flex outwardly when so engaged by a user, said socket portion adapted to receive and frictionally engage the outer peripheral surface of a telephone transmitter, and said mouth receiving portion having inner wall surface diverging outwardly from said diaphragm and defining a funnel shaped voice chamber for channeling sound toward said opening.

References Cited in the file of this patent

UNITED STATES PATENTS

| | | |
|---|---|---|
| 1,757,463 | McCann | May 6, 1930 |
| 2,039,625 | Blount | May 5, 1936 |
| 2,468,721 | Volkman | Apr. 26, 1949 |
| 2,475,303 | Allen et al. | July 5, 1949 |
| 2,540,873 | Florman | Feb. 6, 1951 |